United States Patent [19]

Hashino et al.

[11] 4,181,694

[45] Jan. 1, 1980

[54] METHOD FOR PRODUCING HOLLOW FIBERS OF ACRYLONITRILE POLYMERS FOR ULTRAFILTER

[75] Inventors: Yasuo Hashino, Matsudo; Masatsugu Yoshino, Tokyo; Hitoshi Sawabu, Tokyo; Tsugio Konno, Tokyo, all of Japan

[73] Assignee: Asahi Kasei Kogyo Kabushiki Kaisha, Osaka, Japan

[21] Appl. No.: 538,253

[22] Filed: Jan. 3, 1975

Related U.S. Application Data

[62] Division of Ser. No. 354,785, Apr. 26, 1973, Pat. No. 3,871,950.

[51] Int. Cl.$^2$ .................. B01D 31/00; B29D 27/00
[52] U.S. Cl. .................. 264/41; 210/500 M; 264/177 F; 264/182; 264/209; 428/398
[58] Field of Search ............... 428/398; 264/177 F, 264/209, 41, 182; 210/500 M

[56] References Cited

U.S. PATENT DOCUMENTS

| | | | |
|---|---|---|---|
| 3,447,998 | 6/1969 | Fitzgerald et al. | 264/182 |
| 3,600,491 | 8/1971 | Shimoda et al. | 264/182 |
| 3,636,187 | 1/1972 | Ohfuka et al. | 264/182 |
| 3,674,628 | 7/1972 | Fabre | 264/182 |
| 3,799,356 | 3/1974 | Salzer et al. | 264/182 |

FOREIGN PATENT DOCUMENTS 37-14424 9/1962 Japan .................. 264/177 F
38-9314 6/1963 Japan .................. 264/177 F

*Primary Examiner*—Jay H. Woo
*Attorney, Agent, or Firm*—Armstrong, Nikaido, Marmelstein & Kubovcik

[57] ABSTRACT

Hollow fibers of acrylonitrile polymers having water-permeability greater than 0.2 ml/cm$^2$.min.atm and useful as an inexpensive superior ultrafilter, comprising (1) a porous layer or layers existing on the outer or/and inner sides of said hollow fibers, the average sizes of pores contained in said porous layer or layers and existing on each of assumptive cylindrical surfaces concentric with the central axis of said hollow fibers, having such a gradient that the average sizes of pores contained in the porous layer existing on the outer side become smaller toward the outer surface of said hollow fibers while the average sizes of pores contained in the porous layer existing on the inner side become smaller toward the inner surface of said hollow fibers, and (2) a reticulate porous layer adjacent to said porous layer or layers (1) and containing therein at least one succession of voids having diameters of at least 10–50 $\mu$, are prepared by dissolving an acrylonitrile polymer in an aqueous solution of nitric acid of 65–95% by weight concentration and extruding the resulting spinning solution through a die for hollow fibers, into a coagulation bath containing water or an aqueous solution of nitric acid of 30% by weight or less concentration.

2 Claims, 17 Drawing Figures

FIG. 5(a) (100 TIMES)

FIG. 5(b) (1,000 TIMES)

FIG. 5(c) (8,000 TIMES)

FIG. 5(d) (2,500 TIMES)

FIG. 5(e)   (2,500 TIMES)

FIG. 5(f)
(12,500 TIMES)

FIG. 5(g)
(100 TIMES)

FIG. 5(h)
(54 TIMES)

FIG. 5(i)
(75 TIMES)

FIG. 5(j)
(2,500 TIMES)

FIG. 5(k)
(2,500 TIMES)

METHOD FOR PRODUCING HOLLOW FIBERS OF ACRYLONITRILE POLYMERS FOR ULTRAFILTER

DESCRIPTION OF THE INVENTION

This application is a divisional application based on application Ser. No. 354,785, filed Apr. 26, 1973, now issued as U.S. Pat. No. 3,871,950.

The present invention relates to hollow fibers of acrylonitrile polymers for ultrafilter and a method for producing the same. More particularly, it relates to high performance hollow fibers of acrylonitrile polymers for ultrafilter having a large water-permeability, in which sizes of pores are extremely small and distribution of the sizes is narrow, and the method for producing the same.

An object of the present invention is to provide novel hollow fibers for ultrafilter having a large water-permeability being capable of affording a higher filtration rate; hardly causing the clogging of pores; and hence enabling to carry out continuous filtration operation for a long period of time with the same material. Another object of the present invention is to provide hollow fibers for ultrafilter having a large mechanical strength, a high chemical stability, a superior resistance to microragnisms, hence microbially almost incorruptible, which are useful in various commercial separation processes.

For separating bacteria, proteins, viruses, colloidal substances, etc. by filtration, collodion membrane, gel cellophane film, etc. have been heretofore used. Recently, however, in place of these conventional ultrafilters, cellulose acetate membrane, collagen membrane, dextran membrane, etc. have been newly commercialized, and broad application thereof have been developed in such fields as food industry, pharmaceutical industry, electronic industry, prevention of public nuisance, etc., in addition to those of laboratory scale. However, these conventional filters which have been heretofore used have various drawbacks such as low water-permeability, a considerably high pressure necessary at the time of filtration operation, necessity of exchange of filter within a short period of time due to clogging, etc. Further, ultrafilters of cellulosic membranes which have been mostly used are liable to undergo degradation due to hydrolysis as well as corruption due to microbial action, and moreover their resistance to chemicals is not good.

Recently, studies on methods for producing ultra-filters have been advanced, and methods for producing film having pores of smaller sizes and a larger water-permeability have been proposed.

As one of them there is a method in which solvent within the surface of film is positively vaporized at the time of film-making to form a layer of a dense structure having a thickness of about $0.2\mu$ on one side of film and remaining about $100\mu$ layer of a porous structure. Thus the aim for overcoming the disadvantage of the conventional film has been achieved to a certain extent by this method. According to U.S. Pat. No. 3,567,810 which uses the above-mentioned method, polysulfone, polyacrylonitrile or the like are dissolved in a mixed solvent of dimethylsulfoxide and acetone or N,N-dimethylacetamide and acetone and made into film, but at the time of film-making, the solvent within the surface of film is vaporized, for example, by exposing the film to an air current having a temperature of 90°–150° C., for a few seconds, and then the resulting film is dipped in a coagulation bath to obtain a film having a dense structure in part close to the surface.

The water-permeability of the films thus prepared is improved compared with conventional products, but it is still low, e.g. as low as $0.31$–$0.086$ ml/cm$^2$·min·atm. U.S. Pat. No. 2,846,727 also discloses a similar method, but it can afford only a same extent of water-permeability.

As the result of studies carried out by us in order to overcome the above-mentioned drawbacks of conventional ultrafilter, particularly improvement in water-permeability, ultrafilters have been prepared from acrylonitrile polymers, which show excellent performances as filtration material, i.e. a much greater water-permeability than the conventional products, a large mechanical strength, few clogging and capability of performing continuous filtration operation for a long period of time with the same material, a high chemical stability and a superior resistance to microorganisms.

The present inventors, however, unsatisfied with this result, have continued studies further with regard to the manner for converting the above-mentioned films of high performances into hollow fiber shape, from the viewpoint that for commercial scale, low cost ultrafiltration, hollow fiber shape is preferable to film shape because the effective area of membrane to be contained in a unit space is remarkably increased, and finally succeeded in preparing a gel-like ultrafilter of polyacrylonitrile in the form of hollow fibers having a water-permeability ten to several tens times higher than those heretofore known as hollow fibers of polyacrylonitrile (Belgian Pat. No. 740,927 and M. Bier, Membrane Processes in Industry and Biomedicine, Plenum press, 1971).

The conventional microfilters have been prepared by perforating as many uniform pores as possible through a base material, and the passages of solvent in the microfilters are limited only to the pores. Accordingly, in order to increase the filtration rate, it is necessary to enlarge the diameters of the pores up to a limitation diameter which hinders passage of particles. However, even when the diameters of the pores are enlarged, clogging of pores is still liable to occur, since particles and the diameters of the pores both have a range of distribution to a certain extent.

An idea then occurred to us that a microfilter which gives a higher filtration rate without accompaniment of liability of clogging may be obtained by a structure in which an average pore diameter is made sufficiently small but the number of pores is made sufficiently larger and the basic material also can pass water. This structure is quite contrary to conventional one in which filtration is carried out only through the pores in the basic material but the basic material itself does not pass water at all.

As a means for the embodiment of such an idea one may propose a film having a water-containing gel-like structure, but, polymers gel-like structure, generally form a so-called jelly whose strength is not sufficiently high to make a membrane usable as filter.

Thus, it is a general phenomenon that the increase in water-permeability reduces mechanical strength while the increase in mechanical strength reduces water-permeability. In such a situation, we have succeeded in making two inconsistent characteristic properties consistent as hereinafter described.

As for polymers having a gel-like structure, water-soluble polymers, their copolymers or their cross-linked polymers have been known, but they are mechanically weak in the presence of water and cannot be used as filter even when they are shaped into a film. Thus, we have made a search for materials having a water-containing gel-like structure from among hydrophobic high molecular weight polymers and a method for forming the same. This may apparently be an inconsistent direction for the approach to a film having a water-containing gel-like structure.

In order to give a water-containing gel-like structure, it is necessary that the principal chain or the side chain of the polymers has an affinity with water, and when the affinity of the molecular chain with water is strong, water molecules are coordinated with the chain over the whole length of the molecular chain to form a gel structure having a high water-content. However, if its affinity with water is too strong, the polymers are completely dissolved in water, or even when undissolved, they swell, giving only a film having a poor mechanical strength as above-mentioned. Thus, in order to obtain a microfilter having a high water-content, in other words, a high water-permeability, and yet a large mechanical strength, it is an important keypoint to select a material having an optimum hydrophylic or hydrophobic property.

As for a parameter for expressing the affinity between substances, SP value (solubility parameter) has been often employed. The following Table 1 shows SP values of various kinds of insoluble polymers. The SP value of water is so high as 23.41.

Table 1

| SP values of various kinds of water-insoluble polymers | |
|---|---|
| Polytetrafluoroethylene | 6.2 |
| Polydimethylsiloxane (silicone rubber) | 7.3 |
| Butyl rubber | 7.7 |
| Polypropylene | 7.9 |
| Polyethylene | 7.9 |
| Natural rubber | 8.0 |
| Polyisobutylene | 8.0 |
| Polybutadine | 8.5 |
| Polybutyl acrylate | 8.8 |
| Polystyrene | 9.1 |
| Polysulfide (thiokol rubber) | 9.2 |
| Polymethyl methacrylate | 9.2 |
| Neoprene | 9.3 |
| Polybutadiene-acrylonitrile (75:25) | 9.4 |
| Polyvinyl acetate | 9.4 |
| Polyethyl acrylate | 9.4 |
| Polyvinyl chloride | 9.5 |
| Polyurethane | 10.0 |
| Epoxy resin | 10.1 |
| Ethylcellulose | 10.3 |
| Polyethylene terephthalate | 10.7 |
| Cellulose diacetate | 10.9 |
| Cellulose dinitrate | 11.0 |
| Polymethylene oxide | 11.0 |
| Phenol resin | 11.0 |
| Polyvinylidene chloride | 12.2 |
| Nylon | 13.0 |
| Polymethacrylonitrile | 15.0 |
| Polyacrylonitrile | 15.4 |

As seen in the above-described Table 1, among water-insoluble polymers, the SP value of polyacrylonitrile, i.e., 15.4, is highest and close to the value of water, 23.41. Thus, it can be concluded that polyacrylonitrile is most suitable as the base material for preparing a microfilter having a high water-content and a large mechanical strength.

With regard to sheets or films consisting mainly of polyacrylonitrile, it has been known that they generally show extremely low gas-, and steam- and water-permeabilities as compared to those of other polymers, and by utilizing such low permeabilities, various studies have been made with regard to the development of these materials as packaging materials for preserving fragrance or moisture. Also, by utilizing the characteristics of such low gas-, steam- and water-permeabilities, application of bottles shaped from acrylonitrile polymers, for beer or refreshment drink is now being investigated in earnest, and it is said that if only the problem of discarding the waste of bottles is solved, they will be substituted for glass bottles. This fact evidences that the articles shaped according to a conventional process have low gas-, steam- and water-permeabilities and also a low water-absorptivity, and are extremely excellent in the point of overall resistance to water. Further, they are also superior in resistance to microorganisms and to various chemicals.

We have found also that in spite of their superiority in resistance to water, polyacrylonitrile has a small contact angle which is a parameter for expressing wettability to water, i.e. so-called wettable property, among those of general hydrophobic high molecular weight polymer materials, as shown in the following Table 2:

Table 2

| Contact angles of various polymers | |
|---|---|
| Polyacrylonitrile | 49 |
| Nylon-6 | 52 |
| N-methoxymethyl-polyamide | 52 |
| Polymethyl acrylate | 52 |
| Cellulose diacetate | 53 |
| Polycarbonate | 56 |
| Polyvinyl acetate | 57 |
| Melamine-coated plate | 58 |
| Vinylon (aldehyde-treated PVA) | 61 |
| Polymethyl methacrylate | 62 |
| Phenol resin | 63 |
| Cellulose triacetate | 67 |
| Polyvinyl chloride | 68 |
| Chlorinated rubber | 68 |
| Polyethylene terephthalate | 69 |
| Polytrifluorochloroethylene | 72 |
| Neoprene | 73 |
| Low pressure process polyethylene | 73 |
| High pressure process polyethylene | 81 |
| Polystyrene | 84 |
| Silicone rubber | 90 |
| Polypropyrene | 91 |
| Polytetrafluoroethylene | 104 |

Note: The value for polyacrylonitrile was observed this time. Other values were cited from "Handbook of materials and their water contents" edited by Kobunshi Gakkai, Japan, Kyoritsu Publishing Co. Ltd., 1968.

From the viewpoint that if a filtration film can be prepared from such a water-wettable material, the resulting film would be extremely excellent in stability, we have investigated a method for forming a body of a fine structure which gives a large water-permeability to polyacrylonitrile, and finally succeeded in preparing an ultrafilter from a starting material of polyacrylonitrile, having a large water-permeability and a uniform distribution of pore diameters. As for a method for preparing an ultrafilter from copolymers of acrylonitrile as a raw material, a brief explanation has already been made referring to U.S. Pat. No. 3,567,810. Even when a dense structure is positively formed on the surface part of film by using an organic solvent, then promoting the vaporization of the solvent on the surface part of film, then dipping the resultant film in a coagulation bath, and controlling the diameters of pores by the resulting dense layer, only a product having a poor water-permeability can be obtained due to the presence of the dense layer.

As the result of earnest attempt to find out a method for preparing films having a uniform gel structure without forming such a particularly dense layer as mentioned above, but having fully controlled diameters of pores, an ultrafilter has been prepared by the use of nitric acid as an inorganic solvent, whose water-permeability is by one order greater than those of the films shaped by the use of an organic solvent, and yet whose distribution of pore diameters is narrow.

As for a method for shaping a semi-permeable membrane in the form of hollow fibers to increase the effective area of the membrane per unit space has been well known e.g. in the process for preparing semi-permeable membrane for desalting according to counter-impregnation process, but a high level technique is necessary for shaping such hollow fibers and there is hardly an example of success with regard to this method.

A gel-like ultrafilter of polyacrylonitrile group in the form of hollow fibers, having a water-permeability ten to several tens times larger than those of heretofore known hollow fibers of acrylonitrile polymer, has now been prepared according to the present invention. The term "gel-like" referred to herein means a state containing at least 50% of water based upon volume ratio.

A filter of polyacrylonitrile hollow fibers has already been disclosed in Belgian Pat. No. 740,927, but the product has a low water-permeability and its fine structure is basically different from the filter of hollow fibers according to the present invention.

The difference of the structure of the hollow fibers of the present invention from those disclosed in the above-mentioned Belgian Patent, will be clear from the comparison of the photographs of FIGS. 5a–5k which illustrate the hollow fibers of the present invention, with the specification of said Belgian Patent. Namely, the hollow fibers of the present invention have a great number of voids which are absent in the hollow fibers recited in said Belgian Patent, but have no skin layer. The water-permeability (which is the most important characteristic property of the hollow fibers for ultrafilter) of the present invention is ten times or more larger than that disclosed in said Belgian Patent, due to the above-mentioned specific structure of the product of the present invention.

The filter of hollow fibers according to the present invention has not only a large water-permeability but also as another important property, sufficiently small diameter of pores for carrying out ultrafiltration.

The ultrafilter made of the hollow fibers according to the present invention, as shown in FIGS. 5a–5k (which illustrate several examples thereof), has the following macro-structure:

The hollow fibers have on the outer side, a layer having a thickness of about 20$\mu$ and containing no void; at least one supporting layer close to the above-mentioned layer in which voids having diameters of 10$\mu$ or more are regularly disposed; and on the inner side, a layer having a thickness of about 20$\mu$ and containing no void as in the outer side. These structures are several examples of the filters of hollow fibers according to the present invention. Basically, any structures having a layer or layers which do not contain void on the outer or the inner or both the sides of fibers, combined with a layer or layers close to the above-mentioned layer or layers and having voids, fall within the range of the present invention.

Figure 5A:
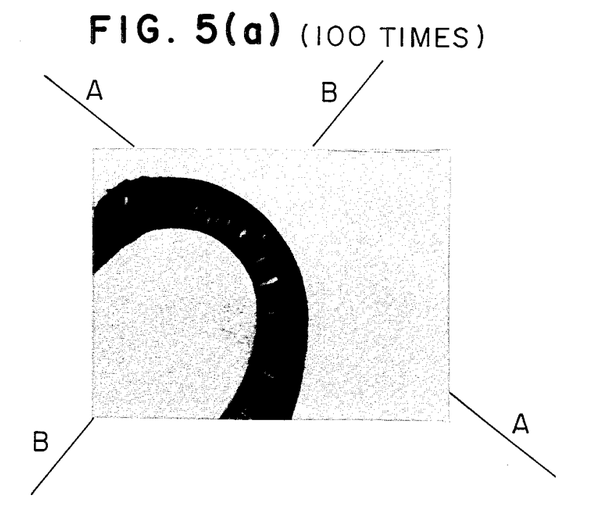
Figure 5B:
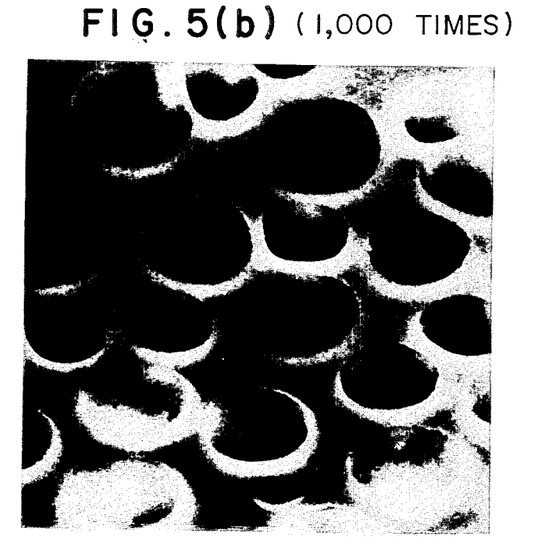
FIG. 5b is a cross section cut along a plane A—A and viewed from the direction of B—B.
Figure 5C:
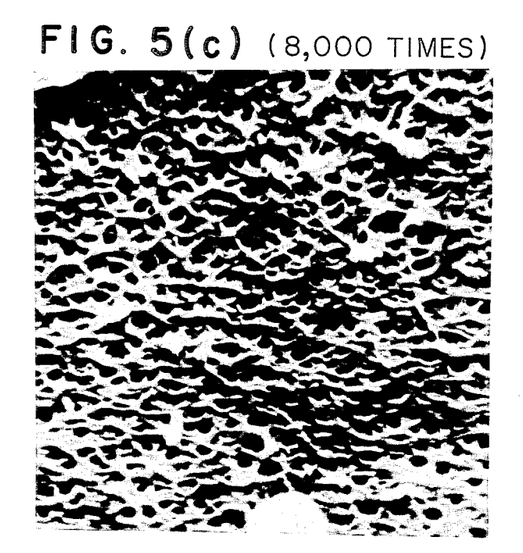
FIG. 5c shows an inside wall of voids.
Figure 5D:
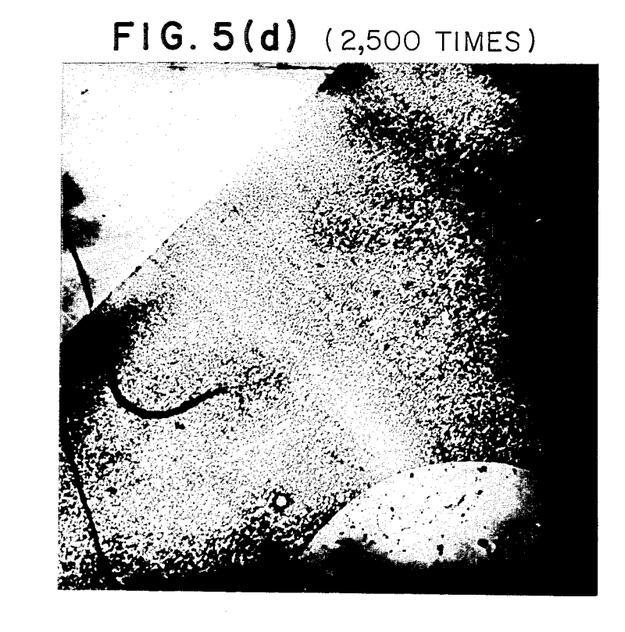
FIG. 5d shows an outer part of the cross-section of the hollow fibers of the present invention.

Further, the micro-structures of each layer thereof are specific as explained hereunder:

The outer side layer which does not have void has a porous structure, and the average diameter of pores in this layer becomes smaller gradually and continuously, as the pores are closer to the outer surface, as seen in FIG. 5d, and this layer has no distinct skin layer as those heretofore known.

Further, a supporting layer which contains voids and is disposed close to the layer which does not contain any void, is formed of a porous substance having a network structure, as shown in FIG. 5c.

Figure 5E:
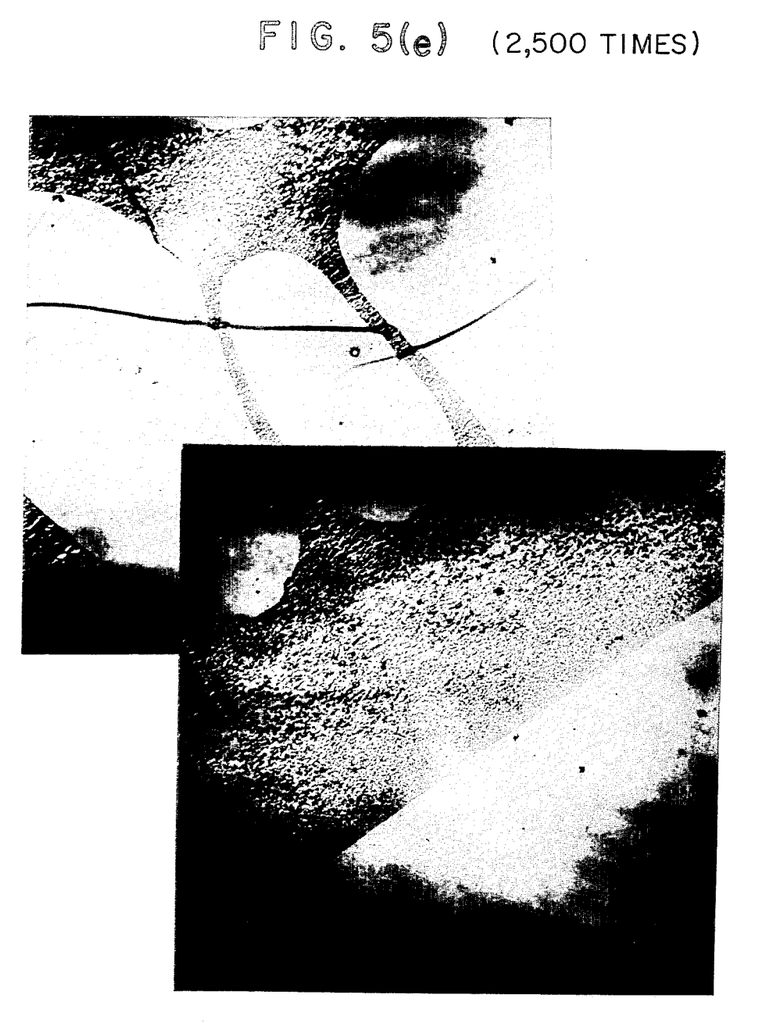
FIGS. 5e and 5f are photographs on an enlarged scale showing the inner part of the cross-section and FIG. 5h is a photograph on an enlarged scale showing the cross-section of conventional hollow fibers of acrylonitrile polymer.
Figure 5F:
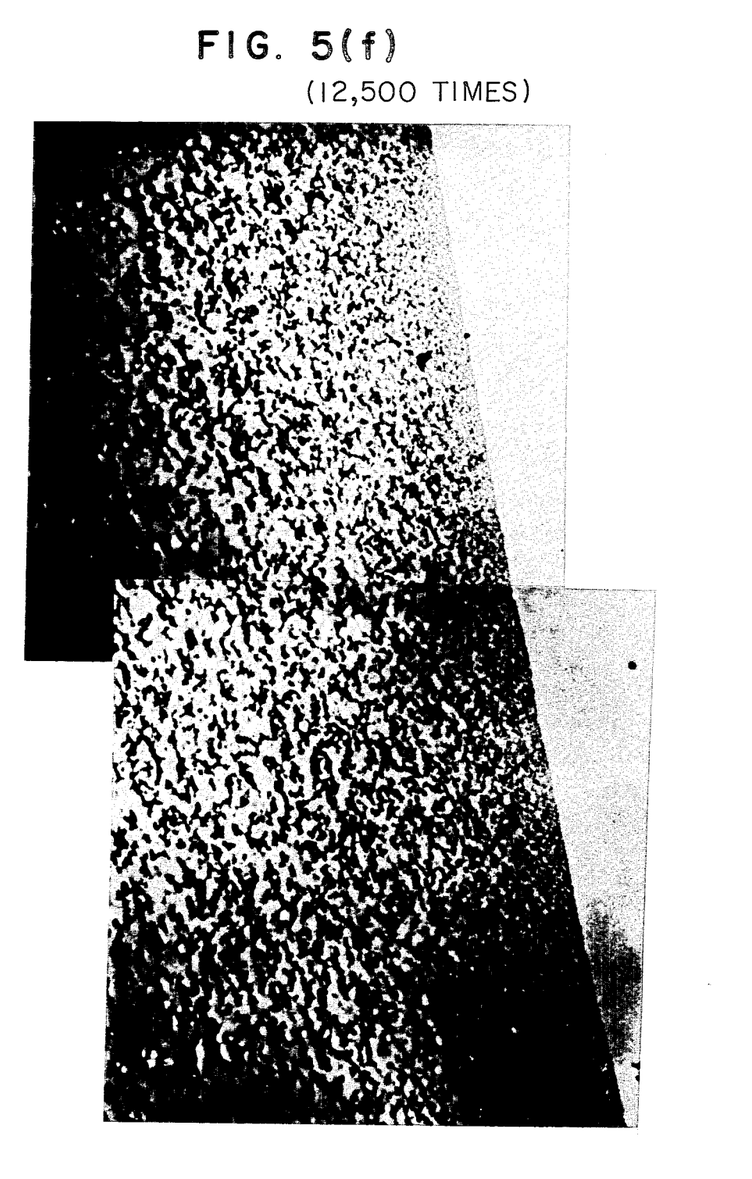

The inner side layer which does not contain void has a similar micro-structure to that of the outer side layer which does not contain voids, as shown in FIGS. 5e and 5f.

The gradient type porous substance layer referred to herein has the following structure:

Referring to FIGS. 5d, 5e and 5f illustrating the examples of this type of layer, said layer is found on the outer- or inner- or both the sides of hollow fibers, and has a thickness of 100–1$\mu$, preferably 30–10$\mu$. When a number of cylindrical surfaces having their centers on the central axis of hollow fibers be assumed, then each of the cylindrical surfaces would have a number of pores each having nearly uniform pore-diameters. The average pore-diameter of pores (in respect of the pores on the same cylindrical surfaces whose central axis are the one of said hollow fibers) contained in each of the cylindrical surfaces, becomes continuously smaller in a linear relationship with a distance of each of the cylindrical surfaces from the imaginary datum cylindrical surface lying in the middle of the zone between the outer surface and the inner surface of hollow fibers, i.e. cylindrical surface lying at the same distance from the outer and inner surfaces. In other words, the remoter a surface from the middle datum cylindrical surface or the closer to the outer and inner surfaces, the smaller the average pore diameter of pores contained in the surface. The pore-diameter of pores contained in the gradient type porous layer is 5$\mu$ or less, preferably about 1$\mu$, on the side close to the middle datum cylindrical surface; and it is 0.1$\mu$ or less or as small as several Å, on the outer or inner surface. The advantage of the hollow fibers of the present invention which does not cause clogging is due to the presence of this gradient type porous layer.

The network porous construction referred to herein is the one shown in FIG. 5c illustrating one example thereof. The size of the network is not limited to the one shown in this figure, but it may take any sizes between 500 Å and 5$\mu$.

Figure 5G:
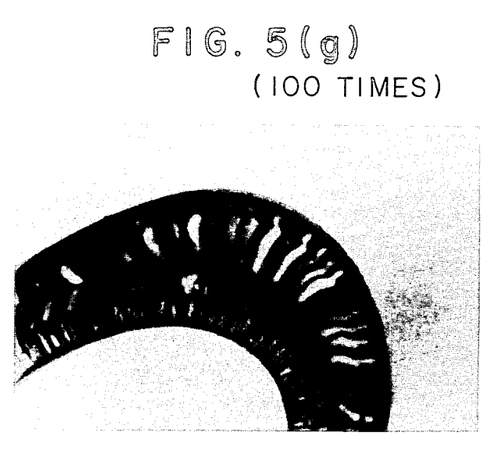

The voids contained in the hollow fibers are portions where hollow fibers-forming polymer is deficient, and water is contained therein in the wet state, but air in the dry state. The voids have a cylindrical shape or a revolving ellipsoid shape having their long axes pointing towards the central axis of hollow fibers. The cross-sectional surfaces perpendicular to the long axes of the voids are nearly circular, and the lengths in the direction of the long axes are twice or more the diameters of the above-mentioned circular cross-sectional surfaces. The sizes of the voids are almost uniform in the same layer, and the voids regularly disposed as seen in FIGS.

5a and 5g. If the diameter exceeds 50μ, the mechanical strength of hollow fibers is undesirably reduced.

Further, the pore-diameters of hollow fibers described in Belgian Pat. No. 740,927 are comparatively large, i.e. as large as 0.6μ (bubble point: 1.5 bar), but nevertheless their water-permeability is comparatively small, i.e. 0.1 ml/cm$^2$.min.atm or less. Whereas, the pore-diameters of the pores in the hollow fibers according to the present invention are very small, e.g. limit of filtration of molecular weight is so small as 45,000 (about 30 Å).

It is the most significant characteristic feature of the hollow fibers of the present invention that the water-permeability is very large i.e. 0.2 ml/cm$^2$.min.atm or more and even greater than 1 ml/cm$^2$.min.atm in most case, in spite of extremely small pore-diameters.

One embodiment of the method for preparing hollow fibers for ultrafilter of the present invention will be described in detail hereunder.

The polymers as raw materials of the hollow fibers of the present invention must contain at least 60% by mol of acrylonitrile units in their molecular chain, and preferably contain 84% by mol or more of acrylonitrile units. If the amount of the acrylonitrile component is less than 84% by mol, the solubility of the polymers in nitric acid is reduced; the viscosity of the resulting solutions is increased; thus, it becomes difficult to produce hollow fibers having uniform properties. The water-permeability is increased with the increase of the content of comonomer. As for the comonomers, the followings can be used:

Olefins such as isobutene, 1-hexene, etc.; ethers such as ethyl vinylether, butyl vinylether, etc.; halogenated olefins such as vinylidene chloride, vinyl chloride, etc.; dienes such as butadiene, isoprene, etc.; esters such as methyl acrylate, ethyl acrylate, methyl methacrylate, vinyl acetate, etc.; aromatic compounds such as styrene, α-methylstyrene, etc.; nitriles such as methacrylonitrile, vinylidene cyanide, etc.; or the like.

Multi-component copolymers containing combinations of the above-mentioned comonomers can be also used. As seen from the below-mentioned data of Examples, the water-permeability is improved with the increase of the amount of comonomer units, but the mechanical strength of hollow fibers begins to be reduced from the amount of the comonomer units of about 14% by mol. If the amount of the comonomer units exceeds 16% by mol, the resultant product cannot be used as a raw material for the hollow fibers of the present invention.

As for the molecular weights of usable polymers, those capable of maintaining mechanical strength and falling within the spinnable range (i.e. intrinsic viscosities of 0.4-3.0 as measured in N,N-dimethylformamide at 35° C.), are sufficient.

As for the solvents to be used for spinning solution for the hollow fibers, nitric acid is most desirable. The nitric acid referred to herein includes the total range of concentrations in which polyacrylonitrile is soluble.

As for solvents capable of dissolving polyacrylonitrile, there are various solvents such as dimethylsulfoxide, N,N-dimethylacetamide, etc., but, as seen from the comparison in Examples, it is difficult to obtain hollow fibers for ultrafilter having a large water-permeability, if solvents other than nitric acid are used.

Further, as for the coagulation bath, water alone is preferable and a content of nitric acid of 30% or less is desirable. As the concentration of nitric acid of the coagulation bath is increased, it becomes difficult to obtain hollow fibers having a large water-permeability.

As for the polymer concentration of the spinning solution to be subjected to spinning of hollow fibers, it is necessary to adjust the concentration to 2-40% by weight, preferably 5-30% by weight, as seen from the below-mentioned data in Examples. The relationship between the polymer concentration and the percentage of water-permeability is shown in Table 5 of Example 3. If the concentration exceeds 40% by weight, the water-permeability becomes very small. Table 5 also shows the relationship between the polymer concentration and the mechanical strength of hollow fibers. The strength is much reduced in a polymer solution of about 5% by weight, and if the concentration is 2% by weight or less, the strength is too small for being used as an ultrafilter. Further, in view of spinnability, if the concentration is 2% by weight or less, the viscosity of the solution is low, while if it exceeds 40% by weight, the viscosity of the solution is too high. Thus, hollow fibers of good quality cannot be obtained in the outside of the range of 2-40% by weight.

Further it is necessary to carry out the dissolution of polymers in nitric acid at a temperature of 0°--5° C., and maintain the temperature during filtration and defoaming. If the temperature of the solution is elevated above 0° C. during the processes of dissolution, filtration and defoaming, a considerable extent of hydrolysis reaction of polymers occurs, and hollow fibers prepared from the resulting solution have a dense structure and their water-permeability is extremely reduced.

Various conditions for spinning hollow fibers of the present invention are summarized as follows.

|  | Best condition | preferable range | operable range |
|---|---|---|---|
| concentration of HNO$_3$ as a solvent | 68% | 65-70% | 65-95% |
| Internal coagulant | water | liquid | liquid |
| Concentration of coagulation bath | water | aqueous solution 0-20% HNO$_3$ | aqueous solution 0-30% HNO$_3$ |
| Concentration of spinning solution | 10-20% | 5-30% | 2-40% by weight |
| Temperature of coagulation bath | 20° C. | 4-50° C. | 4-50° C. |
| Stretching | 0 | 0-1.5 times | 0-1.5 times |
| Take-up speed | 20 m/min | 10-30 m/min | 1-100 m/min |

In the process of spinning of the hollow fibers according to the present invention, it is not preferable to stretch the fibers. In general, when hollow fibers for clothings are prepared by spinning according to a wet process, their mechanical strength is not sufficient unless they are stretched to twice or more the original length in order to give a considerable orientation. Thus, the spinning process of hollow fibers of acrylonitrile polymers heretofore known always include stretching process. However, the water-permeability of the hollow fibers prepared according to such conventional processes are substantially zero and hence the fibers cannot be used as ultrafilter. One of the characteristics of the present invention lies in obtaining a filter having a large water-permeability, though a process containing no stretching step.

BRIEF EXPLANATION OF THE DRAWINGS

FIGS. 5a–5k are microcopic photographs showing the structure of the hollow fibers obtained in the Examples of the present invention, wherein FIGS. 5a and 5b are cross-sectional view of the hollow fibers obtained according to the present invention, FIGS. 5i, 5j and 5k are the photographs of the hollow fibers obtained in Example 22.

Figure 1:
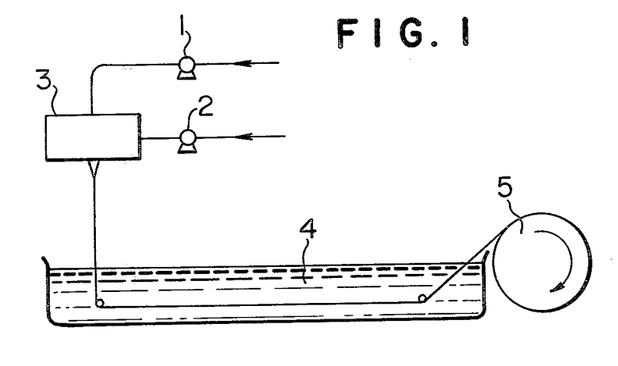
FIG. 1 is a schematic view of vertical cross-section of a spinning machine for hollow fibers for ultrafilter.
Figure 2:
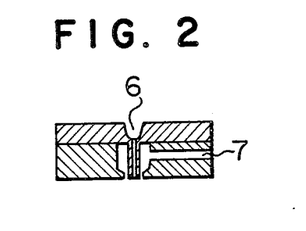
FIG. 2 is a schematic view of vertical cross-section of a nozzle for spinning hollow fibers.

It is preferable to carry out spinning according to wet process as shown in FIG. 1, through nozzles for hollow fibers as shown in FIG. 2.

Figure 3:
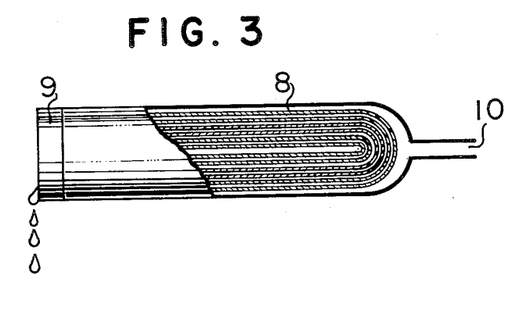
FIG. 3 is a side view of a module used for testing specific properties of hollow fibers for ultrafilters with parts broken away.
Figure 4:
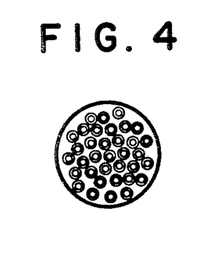
FIG. 4 is a view of the cross-section in enlarged scale of bundles of hollow fibers.

The spinning solution after filtration and defoaming is introduced into a nozzle 3 by means of a gear pump 2. The nozzle 3 has a structure as shown in FIG. 2 in which water is introduced into a hollow portion 6 while the spinning solution is introduced into the outer side portion 7. The fibers extruded from nozzle 3 and enveloping water are coagulated in a coagulation bath 4, and taken up on a take-up roll 5. The liquid to be infused into the hollow portion is not limited to water, but organic solvents stable against nitric acid such as n-heptane, chlorothen, cyclohexane, kerosene, etc. or nitric acid itself can be used. Further, the specific properties of the ultrafilter of hollow fibers obtained according to the present invention were measured by means of a module for testing the specific properties as shown in FIG. 3. In FIG. 3, numeral 8 is a bundle of hollow fibers, numeral 9 is a part subjected to adhesion, and numeral 10 is an inlet for infusing a testing liquid. FIG. 4 shows enlarged cut end surfaces of hollow fibers of the module for testing the specific properties. Next, parameters used herein, for expressing the specific properties of the ultrafilter of hollow fibers will be described.

Water-permeability: $ml/cm^2.min.atm$

For the measurement of water permeability, a given number of hollow fibers as anultrafilter whose outer and inner diameters have been measured in advance, are subjected to adhesion at one end thereof; a pressure difference of one atmosphere is applied between the infusion side and the flow-out side; and then a permeated amount by volume of distilled water per unit time is measured. On the other hand, as to the effective area of film, the surface area of the inner wall of hollow fibers is calculated. The permeated amount of water by volume per unit time is divided by the calculated value of the surface area and the number of atmospheric pressure employed to give water-permeability ($ml/cm^2.min.atm$).

Pore-diameter:

Pore-diameters are too small to allow direct calculation. Thus, aqueous solutions of various kinds of spherical proteins having different sizes were filtered, and the resulting filtrates were analyzed to give standards of pore-diameters.

A list of spherical proteins used in Examples is shown in Table 3.

Table 3

| Spherical proteins for measuring pore-diameters | |
|---|---|
| | Molecular weight |
| γ-Globulin | 160,000 |
| Man serum albumen | 67,000 |
| Egg albumen | 45,000 |
| Pepsin | 35,000 |
| α-Chymotrypsin | 24,500 |
| Myoglobin | 17,800 |
| α-Lactoalbumen | 16,000 |
| Cytochrome-C | 13,000 |
| Insulin | 5,700 |
| γ-Bacitracin | 1,400 |

Filtration limit molecular weight: the least molecular weight of particles completely (100%) unable to pass through ultrafilter of hollow fibers

EXAMPLE 1

Polyacrylonitrile having an intrinsic viscosity of 1.2 as measured in N,N-dimethylformamide was dissolved in an aqueous solution of nitric acid (65%) maintained at $-5°$ C. to give a solution having a concentration of the polymer of 15 g/100 ml, which was then filtered and defoamed while being maintained at $-5°$ C. The resulting solution was introduced into a nozzle 3 by means of a gear pump 2 as shown in FIG. 1. The inner diameter of the capillary at the central part of the nozzle (capillary diameter) was 0.6 mm, and the inner diameter of the nozzle from which the polymer solution was extruded (nozzle diameter) was 2.0 mm. Water was introduced into the nozzle by means of another gear pump 1. The nozzle had a structure as shown in FIG. 2. Water was introduced into the hollow part 6, while the spinning solution was introduced into the outer side part 7. The feeding velocity of water was 1.5 ml/min, and that of the polymer solution was 4.5 ml/min. The fibers extruded from the nozzle and enveloping water were coagulated in a coagulation bath 4 filled with water and taken up on a take-up roll 5. The coagulation bath was maintained at 30° C., and its total length was 10 m.

Take-up velocity was 10 m/min. Hollow fibers thus obtained were sufficiently washed, and their inner and outer diameters were measured to give 0.4 mm and 0.8 mm, respectively.

Using these hollow fibers, a filtration module of hollow fibers as shown in FIG. 3 were prepared. The water-permeability was measured by applying water pressure under two atmospheric pressures. Water was permeated at a rate of 4200 ml/hr per 1 m of one filament. The water-permeability per unit area (calculated based on the surface area of the inner wall) calculated from these data, was 2.8 ml/cm².min.atm, and the filtration limit molecular weight was 45,000. Namely, 100% of pepsin (MW: 35,000) was permeated while 100% of egg albumen (MW: 45,000) was not permeated.

A microscopic photograph of the cross-sectional surface of the hollow fibers in shown in FIG. 5a. FIG. 5b shows a microscopic photograph of a surface given by cutting the hollow fibers of FIG. 5a in the direction of A—A of the Figure and observed in the direction of B—B of the Figure.

FIG. 5c shows a photograph by means of a scanning type electron microscope, of the inner wall surface of voids. FIG. 5d shows an electron microscope photograph of the laterally cross-sectional surface of the outer side part of the hollow fibers. FIGS. 5e and 5f show electron microscope photographs of the laterally cross-sectional surface of the inner side part thereof.

These hollow fibers, as shown in FIG. 5a, have a gradient type porous layer having a thickness of about $40\mu$ on the outer side and another gradient type porous layer having a thickness of about $10\mu$ on the inner side, and further a layer containing voids having lengths of $20$–$50\mu$ and diameters of $5$–$15\mu$.

Next, with copolymers containing methyl acrylate as comonomer and having various compositions (intrinsic viscosity as measured in N,N-dimethylformamide at 35° C.: 2.5–0.4), hollow fibers were prepared according to the same method and the respective specific properties were measured.

The results of the measurement of specific properties of the ultrafilters of hollow fibers obtained using 65% aqueous solution of nitric acid as the solvent of the spinning solution for hollow fibers, are shown in Table 4.

As seen from these results, the water-permeability is improved with the increase of the content of the comonomer units, but the mechanical strength begins to be reduced at a content of about 14% by mol of comonomer units and is too much reduced for being used as filter of hollow fibers.

EXAMPLE 2

An acrylonitrile copolymer containing 1% by mol of methacrylonitrile units and having an intrinsic viscosity of 1.1 as measured in N,N-dimethylformamide was spun in the same manner as in Example 1 to give hollow fibers having an inner diameter of 0.4 mm and an outer diameter of 0.7 mm. The water-permeability was measured by applying water under a pressure of two atmospheres, and the amount of water permeated was 5,750 ml/hr per 1 m of one filament. The water-permeability was 3.8 ml/cm².min.atm, and the limit of molecular weight for filtration was 45,000.

EXAMPLE 3

An acrylonitrile copolymer containing 8% by mol of methyl acrylate units, of an intrinsic viscosity of 1.7 as measured in N,N-dimethylformamide was spun in the same manner as in Example 1, and the relationship between the polymer concentration of the spinning solution and the specific properties of the filter was investigated. The hollow fibers spun from a spinning solution having a concentration of 10% by weight in this Example had an outer diameter of 1.2 mm and an inner diameter of 0.6 mm. The microscopical photo of the cross-sectional surface of the hollow fibers is shown in FIG. 5g.

The hollow fibers have a gradient type porous layer having a thickness of about $5\mu$ on the outer side and another having a thickness of about $10\mu$ on the inner side, and further, voids having lengths of $40$–$150\mu$ and diameters of $10$–$30\mu$.

Table 4

| Composition of comonomer (% by mol) | Size of hollow fibers (mm) | | Thickness of gradient type porous layer ($\mu$) | | Average size of voids ($\mu$) | | Water-permeability (ml/cm² · min. atm) | Limit of molecular weight for filtration | Tensile strength (kg/cm²) |
|---|---|---|---|---|---|---|---|---|---|
| | inner diameter | outer diameter | outer side | inner side | length | diameter | | | |
| 0 | 0.4 | 0.8 | 40 | 10 | 40 | 10 | 2.8 | 45,000 | 31.2 |
| 1 | 0.4 | 0.8 | 40 | 10 | 40 | 10 | 3.5 | 45,000 | 33.1 |
| 8 | 0.4 | 0.8 | 40 | 10 | 40 | 10 | 8.9 | 45,000 | 35.7 |
| 12 | 0.4 | 0.8 | 40 | 10 | 30 | 10 | 11.8 | 45,000 | 28.1 |
| 14 | 0.4 | 0.8 | 40 | 10 | 30 | 10 | 13.5 | 45,000 | 19.0 |
| 16 | 0.4 | 0.8 | 40 | 10 | 30 | 10 | 15.1 | 45,000 | 11.6 |

Table 5
Concentration of spinning solution and specific properties of filter
(Acrylonitrile copolymer containing 8% by mol of methyl acrylate units)

| Concentration of spinning solution (% by weight) | Size of hollow fibers (mm) | | Thickness of gradient type porous layer ($\mu$) | | Average size of voids ($\mu$) | | Water-permeability (ml/cm² · min. atm) | Limit of molecular weight for filtration | Tensile strength (kg/cm²) |
|---|---|---|---|---|---|---|---|---|---|
| | inner diameter | outer diameter | outer side | inner side | length | diameter | | | |
| 2 | 0.6 | 1.0 | 30 | 10 | 40 | 10 | 16.0 | 45,000 | 9.6 |
| 5 | 0.6 | 1.0 | 30 | 10 | 40 | 10 | 14.9 | 45,000 | 25.7 |
| 10 | 0.6 | 1.0 | 40 | 10 | 40 | 10 | 11.1 | 45,000 | 30.8 |
| 15 | 0.6 | 1.0 | 40 | 10 | 40 | 10 | 8.9 | 45,000 | 35.7 |
| 20 | 0.6 | 1.0 | 40 | 10 | 40 | 10 | 5.5 | 45,000 | 40.2 |
| 30 | 0.6 | 1.0 | 40 | 10 | 40 | 10 | 3.2 | 45,000 | 52.4 |

Table 5-continued

| | | | | | | | | | |
|---|---|---|---|---|---|---|---|---|---|
| | | | Concentration of spinning solution and specific properties of filter (Acrylonitrile copolymer containing 8% by mol of methyl acrylate units) | | | | | | |
| Concentration of spinning solution (% by weight) | Size of hollow fibers (mm) | | Thickness of gradient type porous layer (μ) | | Average size of voids (μ) | | Water-permeability (ml/cm² · min. atm) | Limit of molecular weight for filtration | Tensile strength (kg/cm²) |
| | inner diameter | outer diameter | outer side | inner side | length | diameter | | | |
| 40 | 0.6 | 1.0 | 50 | 10 | 20 | 6 | 0.1 | 45,000 | 68.3 |

As seen from these results, the water-permeability is reduced as the concentration is increased, and the high water-permeability which is the characteristic of the hollow fibers of the present invention is lost, at a concentration above 40%. Also, the mechanical strength is much reduced at a concentration of about 5%, and becomes too small to be used as a product for filter, at a concentration of 2%.

EXAMPLE 4

An acrylonitrile copolymer containing 8% by mol of methyl acrylate units (intrinsic viscosity: 1.7) was dissolved in an aqueous solution of nitric acid in the same manner as in Example 1. Spinning was carried out by varying only the concentration of nitric acid of the coagulation bath. The specific properties of hollow fibers thus obtained are shown in Table 6.

The water-permeability is reduced as the concentration of nitric acid is increased, and undesirably much reduced at a concentration of 30% by weight or more.

Comparative Examples

Hollow fibers were prepared in the same manner as in Example 1 except that the solvent for the spinning solution was changed to dimethylsulfoxide. The results of measurement of the specific properties of the resulting products are shown in Table 7.

Table 7

| | | | | | | | | |
|---|---|---|---|---|---|---|---|---|
| | | | Specific properties of ultrafilter of hollow fibers according to dimethylsulfoxide process (comonomer: methyl acrylate) | | | | | |
| Content of comonomer (% by mol) | Size of hollow fibers (mm) | | Gradient type porous layer | | Voids | Water-permeability (ml/cm² · min. atm) | Limit of molecular weight for filtration | Tensile strength (kg/cm²) |
| | inner diameter | outer diameter | outer side | inner side | | | | |
| 0 | 0.5 | 0.8 | no | no | no | 0.40 | 45,000 | 29.5 |
| 1 | 0.5 | 0.8 | " | " | " | 0.31 | 45,000 | 30.3 |
| 8 | 0.5 | 0.8 | " | " | " | 0.02 | — | 31.0 |
| 12 | 0.5 | 0.8 | " | " | " | 0.001 | — | — |
| 14 | 0.5 | 0.8 | " | " | " | <0.0001 | — | — |
| 16 | 0.5 | 0.8 | " | " | " | <0.0001 | — | — |

Hollow fibers spun by using dimethylsulfoxide as a solvent had neither gradient type porous layer nor voids, and their water-permeabilities were small.

Further, spinning was carried out in the same manner as in Example 1 except that N,N-dimethylacetamide was used as solvent. The results of measurement of the specific properties of the resulting products are shown in Table 8.

Table 6

| | | | | | | | | |
|---|---|---|---|---|---|---|---|---|
| | | | Concentration of nitric acid in coagulation bath and specific properties (Acrylonitrile copolymer containing 8% by mol of methyl acrylate units) | | | | | |
| Concentration of nitric acid in coagulation bath (%) | Size of hollow fibers (mm) | | Thickness of gradient type porous layer (μ) | | Average size of voids (μ) | | Water-permeability (ml/cm² · min. atm) | Limit of molecular weight for filtration |
| | inner diameter | outer diameter | outer side | inner side | length | diameter | | |
| 0 | 0.6 | 1.0 | 40 | 10 | 40 | 10 | 8.9 | 45,000 |
| 10 | 0.6 | 1.0 | 40 | 10 | 40 | 10 | 3.8 | 45,000 |
| 20 | 0.6 | 0.9 | 40 | 10 | 40 | 10 | 2.0 | 45,000 |
| 30 | 0.5 | 0.8 | 60 | 15 | 20 | 7 | 0.8 | 45,000 |

Table 8

| Content of comonomer (% by mol) | Size of hollow fibers (mm) | | Specific properties of ultrafilter of hollow fibers according to N,N-dimethylacetamide (comonomer: methyl acrylate) | | | Water-permea-bility (ml/cm² · min. atm) | Limit of molecular weight for filtration | Tensile strength (kg/cm²) |
| --- | --- | --- | --- | --- | --- | --- | --- | --- |
| | inner diameter | outer diameter | Gradient type porous layer | | Voids | | | |
| | | | outer side | inner side | | | | |
| 0 | 0.5 | 0.8 | no | no | no | 0.36 | 45,000 | 30.5 |
| 1 | 0.5 | 0.8 | " | " | " | 0.29 | 45,000 | 31.2 |
| 8 | 0.5 | 0.8 | " | " | " | 0.04 | — | 32.0 |

Hollow fibers spun by the use of N,N-dimethylacetamide as solvent, also had neither gradient type porous layer nor voids, and their water-permeabilities were small.

Figure 5H:
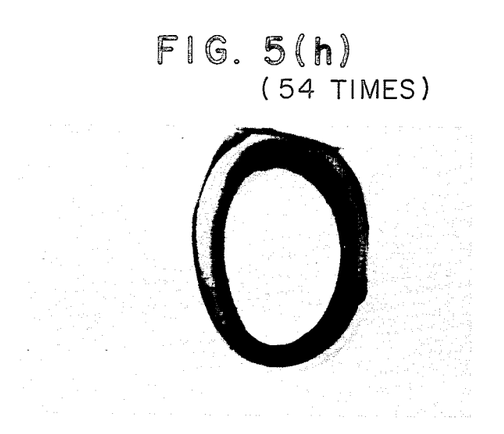

The photograph of the cross-sectional surface of hollow fibers which were spun in the same manner as in Example 1, using N,N-dimethylformamide as solvent, is shown in FIG. 5(h). No voids are contained.

As shown in the above-mentioned Comparative Examples, in the cases of the ultrafilters of hollow fibers prepared according to dimethylsulfoxide process and N,N-dimethylacetamide process, the water-permeability is reduced as the content of comonomer is increased. Whereas, the hollow fibers according to nitric acid process show an entirely contrary tendency that the water-permeability is increased as the content of comonomer is increased. Further, as for the water-permeability, those of the products according to nitric acid process are 10—several tens times those according to dimethylsulfoxide process or N,N-dimethylacetamide process.

EXAMPLE 5

Figure 6:
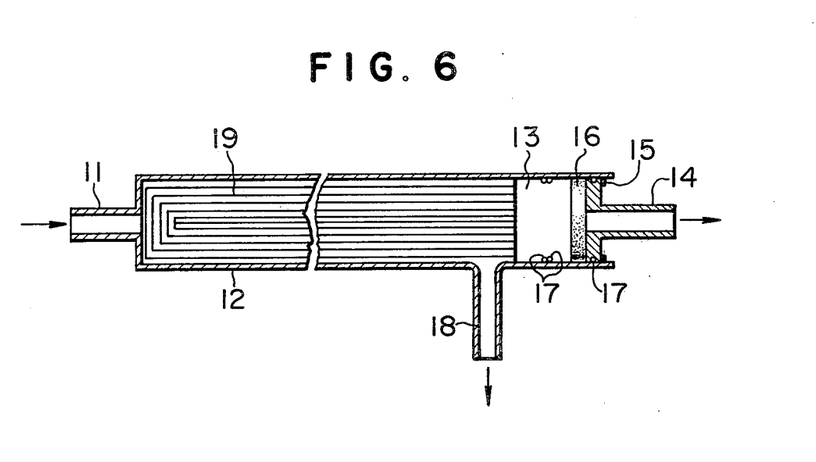
FIG. 6 is a schematic side view of a module used for testing specific properties of hollow fibers for ultrafilters and FIG. 7 is a flow-sheet of a continuous filtering apparatus in which the hollow fibers of the present invention are used.

A filtration module having a construction as shown in FIG. 6 was prepared by using 2000 filaments of hollow fibers (having a length of 1 m) of acrylonitrile homopolymer prepared in Example 1.

In FIG. 6, numeral 11 is an inlet of original waste water, numeral 12 is a unit case, numeral 13 is a part of hollow fibers subjected to adhesion with an adhesive, the hollow parts of hollow fibers being opened only on the surface of the right end of the above-mentioned part, as shown in FIG. 4, numeral 16 is a porous plate, numeral 17 is ano-ring, numeral 15 is a snap ring, numeral 18 is an exit of original liquid, and numeral 14 is an exit of discharge water filtrate which permeated the hollow fibers and is freed of heavy metals.

Figure 7:
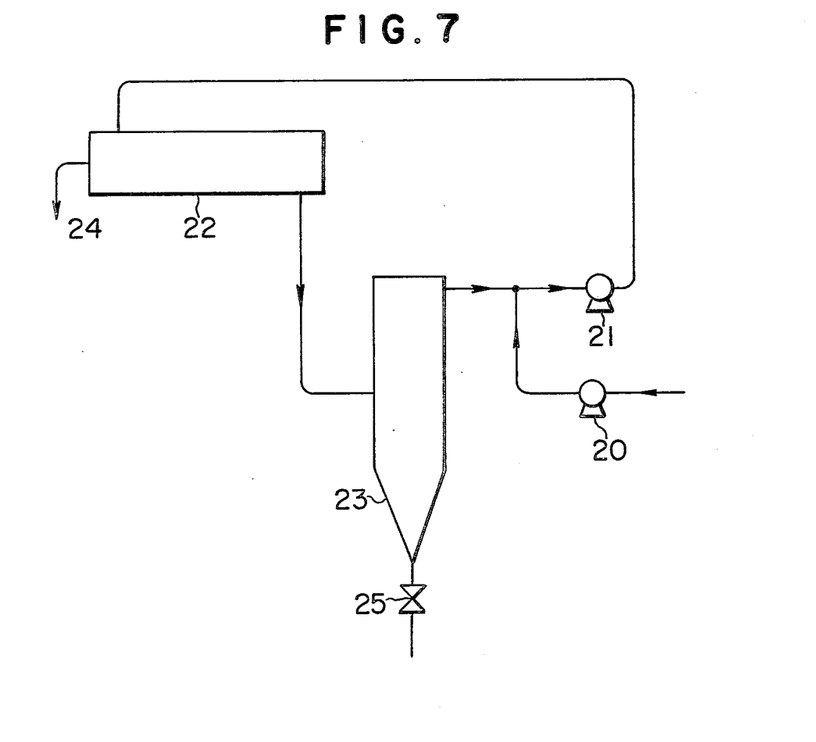

A heavy metals-containing waste water treatment system was set by using the module as shown in the flowsheet of FIG. 7.

To an aqueous solution containing 5 ppm of mercuric chloride, was added sodium sulfide so as to form a concentration of twice mols thereof, whereby mercuric ions were converted to mercuric sulfide. Further, an aqueous solution of ferrous sulfate was added so as to give a concentration of 0.25 ppm, followed by stirring. The resulting colloid dispersion is introduced by means of a feed pump 20. Numeral 21 shows a circulating pump by which coarse large particles formed in the unit of ultrafilter of hollow fibers 22 are fed into a thickner 23. The colloid dispersion pressurized by the feed pump is impregnated into the wall of hollow fibers. At this time, fine particle colloids are forcibly brought to close position to each other to form coarse large particles. The colloid particles converted into coarse large particles are separated by means of the thickner 23, and taken out from a valve 25. On the other hand, water discharged from the exit of discharge water 14 was analyzed whereby a mercury concentration was found to be 0.0007 ppm.

Continuous treatment was carried out for 30 days, and no reduction in permeation velocity due to clogging in the hollow fibers was observed. An operation carried out under a pressure of 1 kg/cm² and a temperature of 38° C. with a treatment capacity of 20 ton/day.

EXAMPLES 6–15

Various kinds of acrylonitrile copolymers were spun in the same manner as in Example 1 to give the respective hollow fibers. The specific properties thereof are shown in Table 9.

Table 9

| Example No. | Composition of copolymer (mol ratio) | Size of hollow fibers (mm) | | Thickness of gradient type porous layer (μ) | | Average size of voids (μ) | | Water-permea-bility (ml/cm² · min. atm) | Limit of molecular weight for filtration |
| --- | --- | --- | --- | --- | --- | --- | --- | --- | --- |
| | | inner diameter | outer diameter | outer side | inner side | length | diameter | | |
| 6 | Acrylonitrile (AN)-isobutene (98:2) | 0.4 | 0.8 | 20 | 10 | 50 | 10 | 1.9 | 45,000 |
| 7 | AN-ethyl vinyl ether (98:2) | 0.5 | 0.9 | 20 | 10 | 50 | 10 | 1.8 | 45,000 |
| 8 | AN-vinylidene chloride (68:32) | 0.5 | 0.9 | 40 | 10 | 40 | 15 | 1.0 | 45,000 |
| 9 | AN-butadiene (99:1) | 0.5 | 1.0 | 20 | 10 | 20 | 10 | 2.4 | 45,000 |
| 10 | AN-styrene (98:2) | 0.4 | 0.8 | 20 | 10 | 40 | 10 | 1.3 | 45,000 |
| 11 | AN-methacrylonitrile (60:40) | 0.5 | 0.9 | 40 | 10 | 40 | 10 | 2.0 | 45,000 |

Table 9-continued

| | | Specific properties of hollow fibers of Examples 6-15 | | | | | | |
|---|---|---|---|---|---|---|---|---|
| | | Size of hollow fibers (mm) | | Thickness of gradient type porous layer (μ) | | Average size of voids (μ) | | Water-permeability | Limit of molecular weight for filtration |
| Example No. | Composition of copolymer (mol ratio) | inner diameter | outer diameter | outer side | inner side | length | diameter | (ml/cm² · min. atm) | |
| 12 | AN-acrylamide (90:10) | 0.5 | 0.9 | 20 | 10 | 30 | 10 | 0.75 | 45,000 |
| 13 | AN-dimethyl-acrylamide (90:10) | 0.4 | 0.9 | 10 | 10 | 40 | 15 | 1.7 | 45,000 |
| 14 | AN-acrylic acid (80:20) | 0.5 | 0.9 | 10 | 10 | 50 | 20 | 1.9 | 45,000 |
| 15 | AN-acrylic acid-methyl acrylate (91:8:1) | 0.6 | 1.0 | 10 | 10 | 50 | 20 | 1.1 | 45,000 |

EXAMPLES 16–20

An acrylonitrile copolymer containing 8% by mol of methyl acrylate units (intrinsic viscosity as measured in N,N-dimethylformamide: 1.6) was spun in the same manner as in Example 1 to obtain hollow fibers having different sizes. The specific properties of the hollow fibers are shown in Table 10. It can be seen that products having similar specific properties can be obtained even when the sizes are thick.

Figure 5I:
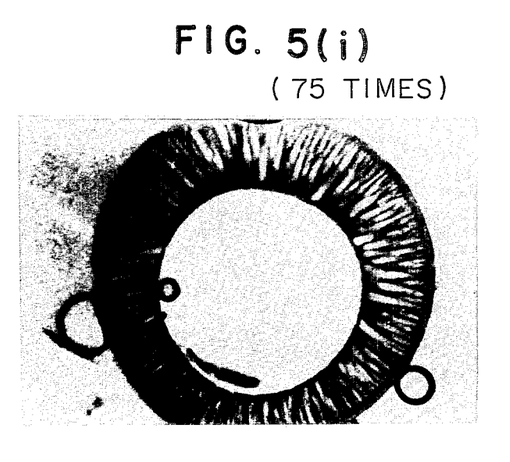
Figure 5J:
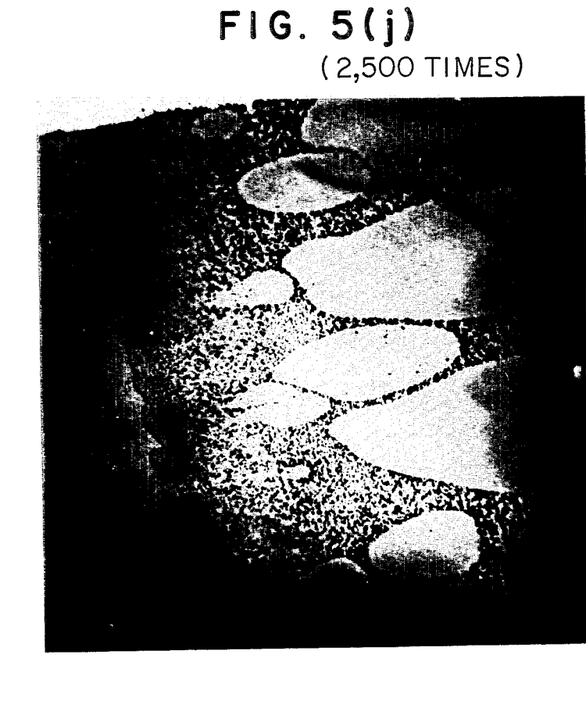
Figure 5K:
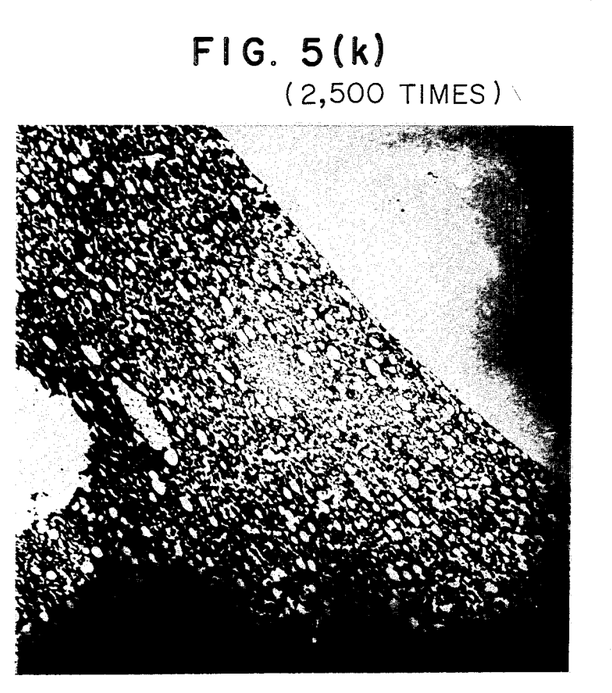

When a liquid which does not show coagulation property for the polymer solution were infused into the hollow portion, hollow fibers having a gradient type porous layer only on the outer side were obtained. As a representative example, photographs having a fine structure of the hollow fibers of Example 22 are shown in FIG. 5i and 5j. FIG. 5i shows a photograph of the whole of the cross-sectiona surface. FIG. 5j shows an electron microscope photograph of the outer side portion of the lateral cross-section and FIG. 5k shows that Table 10

| | Specific properties of hollow fibers of Examples 16-20 | | | | | | | | | |
|---|---|---|---|---|---|---|---|---|---|---|
| | Size of die used (mm) | | Size of hollow fibers (mm) | | Thickness of gradient type porous layer (μ) | | Average size of voids (μ) | | Water-permeability | Limit of molecular weight for filtration |
| Example No. | nozzle diameter | capillary diameter | inner diameter | outer diameter | outer side | inner side | length | diameter | (ml/cm² · min. atm) | |
| 16 | 2.2 | 0.7 | 0.6 | 1.0 | 40 | 10 | 40 | 10 | 2.6 | 45,000 |
| 17 | 2.4 | 0.8 | 0.8 | 1.2 | 30 | 10 | 50 | 10 | 2.5 | 35,000 |
| 18 | 2.8 | 1.0 | 1.0 | 1.8 | 30 | 10 | 100 | 10 | 2.1 | 24,500 |
| 19 | 3.5 | 1.2 | 1.5 | 2.4 | 30 | 10 | 130 | 30 | 1.9 | 17,800 |
| 20 | 4.0 | 2.0 | 2.0 | 3.0 | 30 | 10 | 150 | 50 | 1.9 | 17,800 |

EXAMPLES 21–26

An acrylonitrile copolymer containing 8% by mol of methyl acrylate units (intrinsic viscosity as measured in N,N-dimethylformamides: 1.6) was spun in the same manner as in Example 1 except that the kind of liquid fed into the hollow portion was varied. The specific properties of the hollow fibers thus obtained are shown in Table 11.

of the inner side portion thereof.

EXAMPLES 27–30

An acrylonitrile copolymer containing 8% by mol of methyl acrylate units (intrinsic viscosity: 1.6) was spun in the same manner as in Example 1 except that the concentration of nitric acid used for the preparation of spinning solution was varied. The specific properties of the hollow fibers thus obtained are shown in Table 12.

Table 11

| | | Specific properties of hollow fibers of Examples 21-26 | | | | | | | |
|---|---|---|---|---|---|---|---|---|---|
| | | size of hollow fibers (mm) | | Thickness of gradient type porous layer (μ) | | Average size of voids (μ) | | Water-permeability | Limit of molecular weight for filtration |
| Example No. | Liquid fed into hollow part | inner diameter | outer diameter | outer side | inner side | length | diameter | (ml/cm² · min. atm) | |
| 21 | n-Heptane | 0.5 | 1.0 | 20 | no | 150 | 20 | 1.2 | 45,000 |
| 22 | Cyclohexane | 0.5 | 1.0 | 20 | " | 150 | 20 | 1.3 | 45,000 |
| 23 | Chlorothen | 0.5 | 1.0 | 20 | " | 150 | 20 | 1.0 | 45,000 |
| 24 | Kerosene | 0.5 | 1.0 | 20 | " | 150 | 20 | 1.2 | 45,000 |
| 25 | 65% nitric acid | 0.5 | 1.0 | 20 | " | 150 | 20 | 1.5 | 45,000 |
| 26 | 70% nitric acid | 0.5 | 1.0 | 20 | " | 150 | 20 | 1.5 | 45,000 |

Table 12
Specific properties of hollow fibers of Examples 27-30

| Example No. | Nitric acid concentration of spinning solution (%) | Size of hollow fibers (mm) inner diameter | Size of hollow fibers (mm) outer diameter | Thickness of gradient type porous layer ($\mu$) outer side | Thickness of gradient type porous layer ($\mu$) inner side | Average size of voids ($\mu$) length | Average size of voids ($\mu$) diameter | Water-permeability (ml/cm$^2$ · min. atm) | Limit of molecular weight for filtraton | Bursting strength under pressure |
|---|---|---|---|---|---|---|---|---|---|---|
| 27 | 62 | 0.6 | 1.2 | 30 | 10 | 20 | 10 | 1.3 | 45,000 | 8 |
| 28 | 68 | 0.6 | 1.2 | 30 | 10 | 40 | 10 | 2.6 | 45,000 | 17 |
| 29 | 73 | 0.6 | 1.2 | 40 | 10 | 40 | 10 | 2.5 | 45,000 | 11 |
| 30 | 90 | 0.6 | 1.2 | 40 | 10 | 40 | 10 | 2.5 | 45,000 | 9 |

The strength against pressure (bursting strength) in this Table means a pressure exhibited at the time when hollow fibers in a module set as in FIG. 3 are crushed and broken by the pressure applied through numeral 10 in the Figure. The strength showed the highest value at a nitric acid concentration of 68%. Thus it can be seen that this concentration, 68%, is a best condition for preparing hollow fibers.

What is claimed is:

1. A method for producing gel-like hollow fibers of acrylonitrile polymers for use as ultrafilters which comprises (a) dissolving an acrylonitrile polymer containing at least 60% by weight of acrylonitrile units in an aqueous solution of 65-95% by weight nitric acid at a temperature of from 0° C. to −5° C. to prepare a spinning solution, (b) extruding in the substantial absence of stretching the resulting solution through spinneretts, each having a ring-form orifice, into a coagulation bath having a concentration of up to 30% by weight nitric acid and a temperature from 4°-50° C. and, while extruding, feeding a liquid as an internal coagulant into the central portion of the ring-form orifice to form hollow fibers having (1) an outer layer having a porous structure, (2) a middle layer having voids and (3) an inner layer having a porous structure, (c) subsequently washing the hollow fibers in the substantial absence of stretching, and (d) recovering the resulting gel-like hollow fibers.

2. The method according to claim 1 wherein nitric acid is present in the coagulation bath in a concentration in the range of from 0–20% by weight.

* * * * *